June 7, 1927.
F. L. JAHN
SCREEN
Filed Nov. 19, 1925
1,631,822
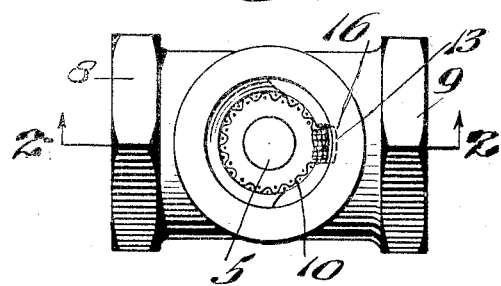
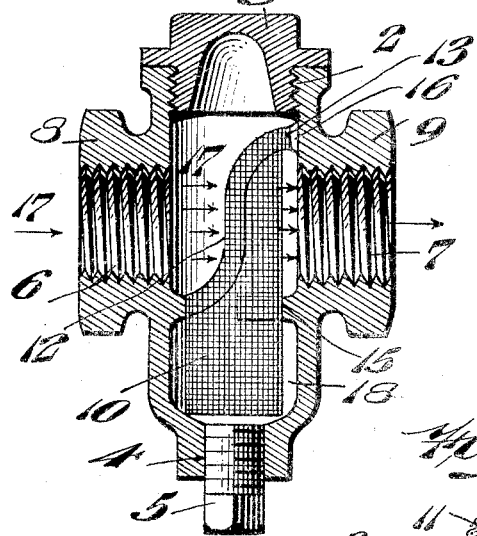
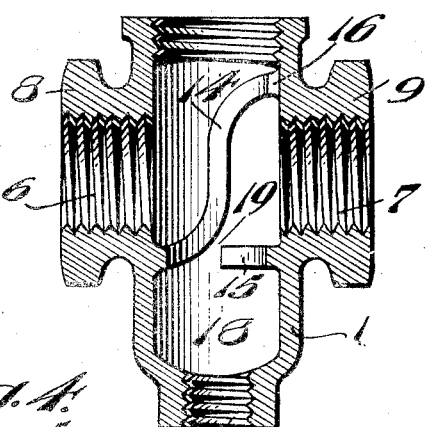
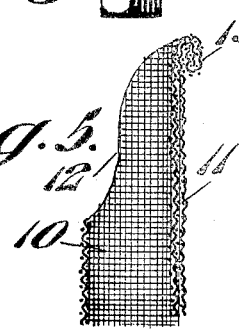
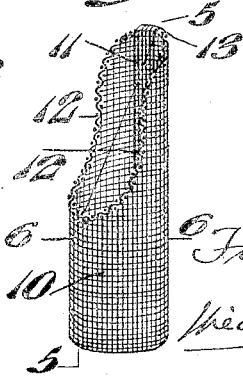
INVENTOR:
Frederick L. Jahn.
BY
ATTORNEYS.

Patented June 7, 1927.

1,631,822

UNITED STATES PATENT OFFICE.

FREDERICK L. JAHN, OF PHILADELPHIA, PENNSYLVANIA, ASSIGNOR TO WATSON & McDANIEL CO., OF PHILADELPHIA, PENNSYLVANIA, A CORPORATION OF PENNSYLVANIA.

SCREEN.

Application filed November 19, 1925. Serial No. 69,957.

My invention relates to a new and useful screen or strainer for pipe lines, conveying either steam, gas, water, oil or the like, and it is adapted to remove the dirt and scale from the fluid passing through the pipe, and is particularly adapted to be used in connection with steam traps and reducing valves, meters or any apparatus which would be clogged or damaged by such dirt or scale; my novel strainer being placed in the pipe line in advance of such apparatus.

An object of my invention is to produce a strainer or screen for the purpose stated, which will offer the least resistance to the flow of the fluid therethrough and which will at the same time be self cleaning or which can be cleaned periodically without removal of the strainer from the pipe line.

Still another object of my invention is to produce a strainer for steam of the character stated, which will produce no pockets in the pipe line but will maintain such pipe line in its original condition thereby eliminating the settling of liquid within the pipe line, when the same is shut off.

With the above ends in view, my invention consists of a cylindrical housing having a transverse inlet and a transverse outlet opening in alignment with each other and extending substantially at right angles to the cylindrical housing, a cylindrical screen adapted to fit within said cylindrical housing, said cylindrical housing being provided with internal ribs for supporting and spacing said screen.

My invention further consists of a cylindrical screen having a reinforcing rib extending longitudinally thereof, said cylindrical screen being truncated at the upper portion thereof, opposed to said reinforcing rib, for the admission of the fluid into said cylinder, while the upper end of said reinforcing rib is bent outwardly and back upon itself, thereby providing an outer spacing projection, which is adapted to seat within a corresponding spacing recess in the housing, thereby to prevent the dislodging of the screen within the housing.

My invention further consists of a suitable threaded cap at the upper portion of the cylindrical housing, to permit the insertion and removal of the screen from the housing, and a lower threaded " blow-off " opening at the bottom of said cylindrical housing, adapted to receive a suitable blow-off valve or pet-cock through which the strainer or screen may be periodically cleaned by blowing off.

For the purpose of illustrating my invention, I have shown in the accompanying drawings forms thereof which are at present preferred by me, since they will give in practice satisfactory and reliable results although it is to be understood that the various instrumentalities of which my invention consists can be variously arranged and organized and that my invention is not limited to the precise arrangement and organization of these instrumentalities as herein shown and described.

Referring to the drawings:—

Figure 1 represents a top plan view of a novel screen or strainer, embodying my invention.

Figure 2 represents a vertical section on line 2—2 of Figure 1, showing the internal construction of my novel screen or strainer.

Figure 3 represents a vertical section also on line 2—2 of Figure 1, showing the housing of my novel screen or strainer, with the upper cap or plug, the cylindrical screen and the lower blow-off plug removed.

Figure 4 represents a perspective view of the screen or strainer removed from the housing.

Figure 5 represents a vertical section on line 5—5 of Figure 4, showing the detailed construction of the reinforcing rib of the screen.

Figure 6 represents a section on line 6—6 of Figure 4.

Referring to the drawings, in which like reference characters indicate like parts, 1 designates the upright tubular or cylindrical casing or housing of my novel screen, having its upper end internally threaded, as at 2, and adapted to receive a suitable threaded plug or cap 3, and having its lower end provided with a relatively small internally threaded opening 4 for the reception of either a sediment plug 5, or a blow-off valve or pet-cock, (not shown in the drawings), through which the sediment may be removed periodically by blowing off.

The internally threaded inlet opening 6, and the similarly threaded outlet opening 7, are provided in the upper portion of the tubular cylindrical casing 1, in alignment with each other and at substantially a right angle to said cylindrical housing, thereby forming a straight fluid passageway through the housing. Each of the openings 6 and 7 are continued through suitable hexagonal projections of bosses 8 and 9 respectively. The cylindrical screen or strainer proper 10, formed in the shape of a cylinder, has its overlapping edges bent over so as to interlock with each other and to form a reinforcing rib 11 of multiple thickness. The upper portion of the cylindrical screen is then truncated along a curved plane, shown by the line 12. The upper terminal of the reinforcing rib 11, is bent outwardly back upon itself so as to produce a slight projection 13 whereby said cylindrical screen may be retained in position against any rotation thereof.

The cylindrical screen 10 is adapted to seat longitudinally within the cylindrical housing 1, as shown in Figures 1 and 2 and is centered within said housing and supported therein, against the force of the moving liquid or fluid, by an upper supporting rib 14 extending from the top of the outlet opening to the bottom of the inlet opening, and the lower longitudinal supporting or centering rib 15 positioned directly below the outlet opening and having its terminals spaced a suitable distance from the upper rib; said two ribs being formed integral with the housing. The inner seating surfaces of the ribs 14 and 15 are cut cylindrical so as to provide accurate seating surfaces for the cylindrical screen 10. The recess 16 in the upper part of the upper rib 14, is adapted to receive the projection 13 of the screen 10, thereby to maintain said screen in fixed relation to the housing and to prevent the rotation thereof.

The fluid thus entering through the inlet opening 6, in the direction of the arrows 17, passes through the upper truncated portion of the cylindrical screen, and emerges through the outlet opening 7, practically in a straight line and without changing the direction of flow or deviating from a straight path in its course through the housing or strainer. Due to this unobstructed flow in a straight line and due to the absence of any pocket rising above the line of the pipe or the level of the inlet and outlet openings, the settling of liquid within the pipe line is eliminated, since such pipe is unobstructed. This is of particular advantage where a liquid is apt to settle out of a gas, such as oil out of compressed gas and water out of steam, in which cases any obstruction rising above the pipe line or pipe cross section and forming a pocket, will cause a gradual settling of the liquid within the pipe to the height of such obstruction or pocket, thereby also decreasing the flow of the fluid through said pipe line.

Since the inlet and outlet openings are in the upper portion of the cylindrical housing 1, the lower portion thereof forms a sediment chamber 18, which is below the level of the openings 6 and 7 and hence the sediment will fall below the pipe line and out of the path of travel of the fluid. It will also be noted that the upper rib 14 and the lower rib 15 are not continuous throughout a circle, but are separated with the passages 19 therebetween. This permits the passage of the fluid from the lower portion of the cylinder and the sediment chamber 18, into the outlet opening. Thus, if the flow of the liquid is excessive or if the upper portion of the screen becomes clogged, the fluid may travel down through the cylindrical screen and pass through the lower portion of the screen into the sediment chamber 18, and hence through the passageways 19 into the outlet opening 7, thereby facilitating the passage of the fluid through the device even though the upper portion of the screen, in the direct path of the fluid, may be slightly clogged.

It will now be apparent that I have devised a novel and useful construction in screens, which embodies the features of advantage enumerated as desirable in the statement of the invention and the above description, and while I have, in the present instance, shown and described preferred forms thereof, which will give in practice satisfactory and reliable results, it is to be understood that such embodiments are susceptible of modification in various particulars without departing from the spirit or scope of the invention or sacrificing any of its advantages.

Having thus described my invention, what I claim as new, and desire to secure by Letters Patent is:—

1. In a device of the character stated, an elongated tubular housing having a fluid passageway extending transversely through the upper portion thereof at substantially a right angle thereto and in substantially a straight path, a sediment chamber in the lower portion of said tubular housing below the level of said fluid passageway, an upper spacing and supporting rib projecting from the inner surface of said housing and formed integral therewith, extending from the upper portion of the outlet end of said passageway to the bottom of the inlet end of said passageway, a substantially horizontal lower spacing and supporting rib directly below the lower level of the fluid passageway on the outlet side thereof, having its terminals spaced a suitable distance from the upper spacing and supporting rib; the bearing surfaces of said two ribs being cylindrical in shape and substantially coaxial with the tubular housing.

2. In a device of the character stated, an elongated tubular housing having a fluid passageway extending transversely through the upper portion thereof at substantially a right angle thereto and in substantially a straight path, a sediment chamber in the lower portion of said tubular housing below the level of said fluid passageway, an upper spacing and supporting rib projecting from the inner surface of said housing and formed integral therewith extending from the upper portion of the outlet end of said passageway to the bottom of the inlet end of said passageway, a substantially horizontal spacing and supporting rib, a lower horizontal spacing rib directly below the lower level of the fluid passageway on the outlet side thereof and having its terminals spaced a suitable distance from the upper spacing and supporting rib; the bearing surfaces of said two ribs being cylindrical in shape and coaxial with the tubular housing, and an elongated tubular screen within said housing and supported axially with respect thereto by said spacing and supporting ribs; the upper edge of said tubular screen conforming substantially to the contour of the upper of said two spacing and supporting ribs.

3. In a device of the character stated, an elongated tubular housing, a fluid passageway extending transversely through the upper portion thereof substantially at a right angle thereto and in a substantially straight line, an elongated tubular screen within said housing having the upper edge thereof inclined from the top of the exit side of the fluid passageway to the bottom of the inlet side of said fluid passageway, and a laterally and outwardly projecting locking projection carried by the upper portion of said screen on the outlet side thereof and a corresponding recess in the inner surface of the housing for receiving said projection, thereby to lock said screen with respect to said housing.

4. In a device of the character stated, an elongated tubular housing, a fluid passageway extending transversely through the upper portion thereof substantially at a right angle thereto and in substantially a straight line, an elongated tubular screen within said housing having the upper edge thereof inclined from the top of the exit side of the fluid passageway to the bottom of the inlet side of said fluid passageway, and a reinforcing rib extending longitudinally of said screen on the outlet side thereof, said rib having its upper end bent outwardly and back upon itself to form a locking projection and a corresponding recess in said housing to receive said locking projection.

5. In a device of the character stated, an elongated tubular housing having a fluid passageway extending transversely through the upper portion thereof at substantially a right angle thereto and substantially a straight path, a sediment chamber in the lower portion of said tubular housing below the level of said fluid passageway, an upper spacing and supporting rib projecting from the inner surface of said housing and formed integral therewith, extending from the upper portion of the outlet end of said passageway to the bottom of the inlet end of said passageway, a substantially horizontal spacing and supporting rib, a lower horizontal spacing rib directly below the level of the fluid passageway on the outlet side thereof, having its terminals spaced a suitable distance from the upper spacing and supporting rib; the bearing surfaces of said two ribs being cylindrical in shape and substantially coaxial with the tubular housing, and an elongated tubular screen within said housing, supported coaxially with respect thereto by said spacing and supporting ribs; the upper edge of said tubular screen conforming substantially to the contour of the upper of said two spacing and supporting ribs, and a reinforcing rib extending longitudinally of said screen on the outlet side thereof; said rib having an end thereof bent outwardly and back upon itself to form a locking projection.

FREDERICK L. JAHN.